Feb. 13, 1934.　　　F. H. OWENS　　　1,946,589
METHOD AND APPARATUS FOR RECORDING AND REPRODUCING
PHOTOGRAPHIC SOUND RECORDS
Filed Nov. 22, 1930
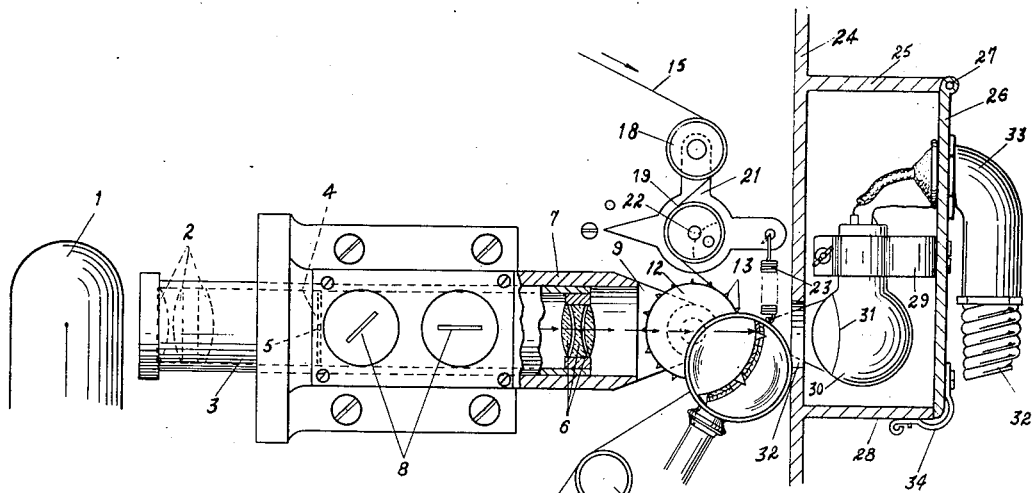
Fig.1.
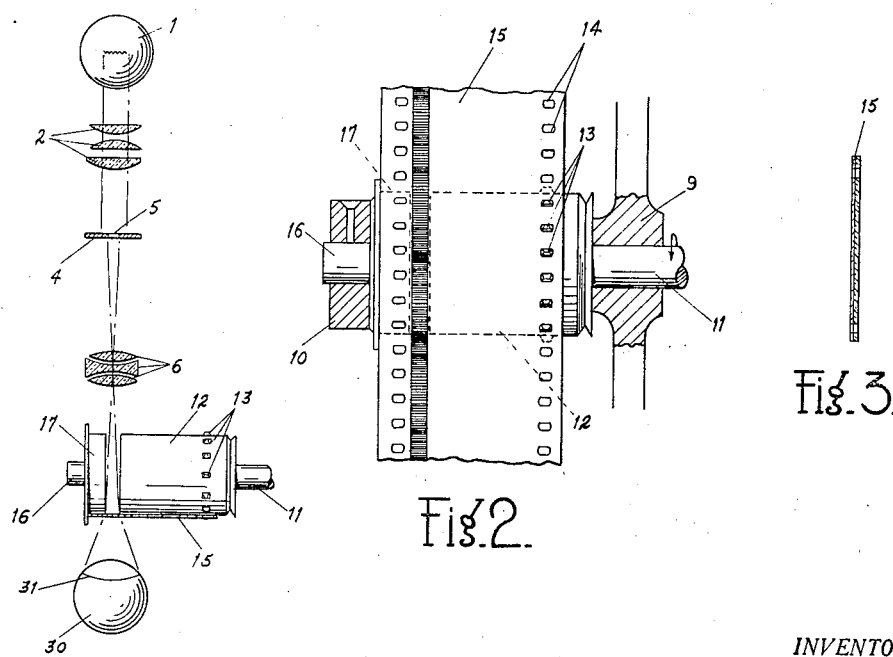
Fig.2.　　Fig.3.
Fig.4.
INVENTOR.
FREEMAN H. OWENS.
BY Philip S. Hopkins
ATTORNEY.

Patented Feb. 13, 1934

1,946,589

UNITED STATES PATENT OFFICE 1,946,589

METHOD AND APPARATUS FOR RECORDING AND REPRODUCING PHOTOGRAPHIC SOUND RECORDS

Freeman H. Owens, New York, N. Y.

Application November 22, 1930
Serial No. 497,441

6 Claims. (Cl. 179—100.3)

My invention relates to a method and apparatus for recording and reproducing photographic sound records.

As is well known, photographic sound records are produced by exposing upon moving strip of sensitized film, a light beam modulated either in intensity or in size characteristics of the sounds to be recorded. This sound modulated light, acting upon a narrow strip of sensitized film exposes such strip and when the same is developed in the usual manner, leaves a visible photographic image of the modulated light, thus forming the photographic sound record which can be reproduced by translating into electric impulses, then rendered audible through loud speakers.

There are in general two types of apparatus which have been utilized in recording and reproducing photographic sound records, one type utilizing either a straight or slightly curved gate through which the film travels past the point of translation (recording or reproducing), and the other type comprising a roller or sprocket over which the film travels at such point of translation.

The first type, namely the straight or curved fixed gate, has many disadvantages, among which are the danger of scratching the film, the friction imposed upon the film as it is rapidly drawn through and in contact with the surface of the gate, the tension required at the back of the film to hold it in flat contact engagement with the straight or curved gate surface, the ease with which the tiny slit through which the light passes to the film becoming closed by dirt or other foreign substances, and lastly, and probably the most objectionable, the difficulty in keeping the film at the sharply focused position of the light. This difficulty grows out of the inherent characteristics of this type of film gate, for if sufficient tension or pressure is placed upon the film to hold it in definite focused relation to the light, the friction upon the traveling film is too great for proper running of the film. If the tension is lightened, the chances are increased for the film to, from time to time, move slightly away from the gate surface and out of sharp focus whereby the exposure or reproduction of the sound record at such point or points is rendered imperfect.

The other type of gate eliminates most of these objections but as heretofore employed has not overcome the last objection above noted, namely, that of permitting the recording or reproduction of the sound record at certain points to get out of focus position with respect to the light.

By my invention I have overcome this difficulty and have made it possible with the roller or sprocket type of film gate at the point of translation, to insure the film which is to receive, or which carries the sound record being in exact and perfect focus with respect to the light, at all times.

This forms the principal object of my invention and more specifically stated it comprises the training or placing and maintaining the film around the roller gate at the point of translation, with the emulsion side of the film, which receives and bears the photographic images, next to the periphery of the rollers or sprockets which comprise the gate. With the light focused sharply at the peripheral point on the gate it will be clear that the sound record will thus always be in sharp focus with respect to the light.

Another object of my invention lies in the provision of a roller gate with the light source on one side thereof and focused sharply upon the opposite peripheral plane of the gate, and with the emulsion side of the film always maintained in said plane in alignment with the focus of said light. This eliminates the chance of variation on focus of the light on the sound track due to varying thickness of film, and the consequent variation in volume of sound reproduced, as well as distortion.

According to my invention the emulsion side of the film is always maintained in perfect focal position with respect to the light and receives the light before the same has passed through the body of the film, thus insuring a perfectly focused, clear, sharp exposure at the recording and reproducing point, unaffected by any variations in thickness or color or other light passing characteristics of the film base.

In addition and forming another object of my invention, I have provided a novel type of mount for the photoelectric cell, or other light sensitive element used in the reproduction of photographic sound records, which insures proper position of the cell with respect to the light and sound record and which also renders the cell of ready access for renewal, cleaning or repairing.

Other objects and advantages in details of construction and arrangement will be apparent as the description proceeds, reference now being had to the figures of the accompanying drawing forming a part of this application and wherein like reference characters indicate like parts.

In the drawing:—

Figure 1 is a somewhat diagrammatic side view of an apparatus illustrating my invention, certain parts being shown in sections for clearness of illustration.

Figure 2 is a front view partly in section, of one type of gate which may be used with my invention.

Figure 3 is a detail sectional view of a photographic film such as employed with my invention.

Figure 4 is a diagrammatic plan view of a sound reproducing device, illustrating the focus of the light upon the opposite peripheral plane of the roller gate, with the emulsion side of the film in such plane.

I have shown my invention in the drawing in connection with a reproducing apparatus but it should be clearly understood that the same is equally adaptable to recording as well by merely making the necessary changes in the type of light and other units more properly adaptable to recording. There are many and varied constructions of both recording and reproducing units with which my invention is clearly usable. As illustrative however, I have shown and described only one form of a reproducing unit.

Reference character 1 indicates a lamp or other light source, the light from which is caught by a set of condenser lenses 2, mounted in a hollow tube 3, within which is disposed a slit plate 4, provided with the fine slit 5, to be illuminated by the lamp 1. Also mounted in the tube 3 is a focusing lens unit 6 in alignment with the lamp 1 and slit 5, the purpose of which is to sharply focus the illuminated areal image of the slit 5 at a point presently to be described. The tube 3 is preferably longitudinally and rotatably adjustable within a housing 7 and means are shown diagrammatically only at 8 for providing such adjustments.

The housing 7 is provided with a pair of parallel spaced forwardly extending bracket members 9 and 10, the former of which serves as a bearing for shaft 11 adapted to be driven from any source of power at an even, uniform rate of speed. Mounted upon this shaft 11 for rotation therewith is a film sprocket 12 provided adjacent one end with sprocket teeth 13 adapted to engage within the perforations 14 disposed along one edge of the photgraphic film 15.

The bracket 10 forms a bearing for a pintle 16 upon which is mounted a flanged roller 17 in axial alignment with the sprocket 12 and of the same diameter of such sprocket. Roller 17 is preferably an idler.

The inner ends of the sprocket 12 and roller 17 are spaced to permit an unobstructed passage therebetween, such passage being in alignment with the lens 6 and slit 5, whereby the focused light image of said slit may reach the film 15 at a point directly on the peripheral plane of the rollers. Preferably the tube 3 is so adjusted as to focus the illuminated image of the slit 5 sharply at a point flush with the periphery of the sprocket 12 and roller 17 on the side thereof opposite the light.

The film 15 is trained downwardly first over an idler roller 18, then around a second idler roller 19, then around the sprocket 12 and roller 17 and then around a third idler roller 20. The idler rollers are so disposed with respect to the periphery of the sprocket 12 and roller 17 over which the film passes, as to insure the film 15 being held in tight peripheral engagement with said sprocket and roller. To assist in causing this contact engagement of the film with the sprocket and roller gate, the roller 18 is mounted upon a bracket 21 pivoted about the shaft 22 of the roller 19, and normally urged forwardly into film engaging position by a coil spring 23, as is shown clearly in Figure 1.

The film 15 is so trained over the sprocket 12 and roller 17 as to bring its emulsion side, as indicated in Figure 3, into engagement with the sprocket and roller and consequently past the passage between the sprocket and roller exactly on the peripheral plane thereof, and consequently in exact focus with the illuminated image of the slit 5. Thus, whether the device is used for recording or reproduction, the focus of the light must certainly always be perfect with respect to the record carrying side of the film. This results in more accurate and faithful translation of photographic sound records, both as regards volume and distortion.

It will be noticed with reference to Figure 1 that I have provided also a novel form of mount for the photoelectric cell used in photographic sound reproduction. The wall 24 may designate the wall on the housing or projector casing, if the sound is produced synchronously with motion pictures. Provided on the wall 24 is the housing 25, the back wall 26 of which is pivoted or hinged as at 27 to the top wall, to provide a door, the lower end of which is adapted to butt against the bottom wall 28 of the housing when in closed position. This door 26 is provided on its inner side with a bracket 29 adapted to hold a photoelectric cell 30, the window 31 of which is in alignment with an opening 32 cut in the wall 24 directly opposite the light passage between the ends of the sprocket 12 and roller 17 whereby to admit the light passing through the sound record on the film 15 to the photoelectric cell.

The electric connections to the photoelectric cell pass outwardly through the door 26 and through a cable or conduit 32 having proper connections with an amplifier and loud speaker. The cable 32 is secured as by a nipple 33, rigidly with the door 26.

It will thus be seen that I have provided a mounting for the photoelectric cell which permits easy access thereto for cleaning, repairing or renewal and which when closed to the position shown in Figure 1, automatically brings the photoelectric cell in direct alignment with and at the proper distance from the point of sound translation. A spring snap 34 provides means for retaining the door 26 in its closed position.

Many changes may be made in details of construction and arrangement without departing from the spirit and scope of my invention. I do not limit myself therefore, to the exact form herein shown and described other than by the appended claims.

I claim:—

1. Means for recording and reproducing photographic sound records comprising a rotatable member, in engagement with which a film is adapted to be moved, a light on one side of said member, the rays of which are focused direct and sharply at a point in the peripheral plane of the opposite side of said member, and means for maintaining the emulsion side of said film in engagement with the side of said member opposite said light and in the peripheral plane thereof and in the focus of said light.

2. Means for recording and reproducing photographic sound records comprising a roller over which a film is adapted to be moved with the emulsion side thereof positively maintained in engagement with one side of said roller, said film overhanging one end of said roller in the same peripheral plane thereof, and a light disposed on the opposite side of said roller, the rays of which are focused sharply upon the roller engaging side of the overhanging portion of said film, and rotatable means for supporting the extreme overhanging edge of said film whereby the same is maintained in the peripheral plane of said roller.

3. Means for recording and reproducing photographic sound records comprising a roller over which a film is adapted to be moved with the emulsion side thereof positively maintained in engagement with one side of said roller, said film overhanging one end of said roller in the same peripheral plane thereof, and a light disposed on the opposite side of said roller, the rays of which are focused sharply upon the roller engaging side of the overhanging portion of said film, and means for supporting the extreme overhanging edge of said film whereby the same is maintained in the peripheral plane of said roller, said means comprising an axially aligned roller spaced from said first named roller.

4. Means for reproducing photographic sound records comprising a rotatable member over and in engagement with which a film bearing a photographic sound record is adapted to be moved, the emulsion side of said film being in engagement with said member, a light source disposed on the side of said member opposite and in direct alignment with the film engaging side, means for focusing said light on said emulsion side at a point in the peripheral plane of said member and in registry with said record, and a photo-electric cell in position to receive the sound record modulated light from said light and film.

5. Means for reproducing a photographic sound record comprising a light source, a photoelectric cell, a rotatable film supporting member between said light and cell, means for maintaining a film bearing a sound record in engagement with the side of said member directly opposite said light and with the sound record in alignment with said light and said cell at a point in the peripheral plane of said member, and means for focusing said light on said film at such point of alignment.

6. Means for reproducing a photographic sound record comprising a light source, a photoelectric cell, a rotatable film supporting member between said light and said cell, means for maintaining a film bearing a photographic sound record in engagement with the side of said member directly opposite said light and with the emulsion side of said film towards said light, and means for focusing said light on the sound record of said film at a point in the peripheral plane of said member and in alignment with said cell.

FREEMAN H. OWENS.